United States Patent
Vasseur et al.

(10) Patent No.: US 9,853,882 B2
(45) Date of Patent: Dec. 26, 2017

(54) DYNAMIC PATH SWITCHOVER DECISION OVERRIDE BASED ON FLOW CHARACTERISTICS

(71) Applicant: Cisco Technology, Inc., San Jose, CA (US)

(72) Inventors: Jean-Philippe Vasseur, Saint Martin d'Uriage (FR); Sukrit Dasgupta, Norwood, MA (US)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 14/589,421

(22) Filed: Jan. 5, 2015

(65) Prior Publication Data

US 2016/0028616 A1 Jan. 28, 2016

Related U.S. Application Data

(60) Provisional application No. 62/028,229, filed on Jul. 23, 2014.

(51) Int. Cl.

| *H04L 12/56* | (2006.01) |
| *H04L 12/707* | (2013.01) |
| *H04L 12/727* | (2013.01) |
| *H04L 12/725* | (2013.01) |
| *H04L 12/863* | (2013.01) |
| *H04L 12/26* | (2006.01) |
| *H04L 12/729* | (2013.01) |
| *H04L 12/703* | (2013.01) |
| *H04L 12/24* | (2006.01) |

(52) U.S. Cl.
CPC .............. *H04L 45/22* (2013.01); *H04L 47/50* (2013.01); *H04L 41/147* (2013.01); *H04L 43/0888* (2013.01); *H04L 45/125* (2013.01); *H04L 45/28* (2013.01)

(58) Field of Classification Search
CPC ....... H04L 45/22; H04L 45/28; H04L 45/302; H04L 45/44; H04L 47/122; H04L 45/00; H04L 45/02; H04L 45/125; H04L 45/24; H04L 45/306; H04L 47/10; H04L 45/028; H04L 47/125; H04L 47/20; H04L 47/2408; H04L 45/10; H04L 45/11; H04L 45/127
USPC ................. 370/351, 252, 400, 254, 229–237
See application file for complete search history.

(56) References Cited

U.S. PATENT DOCUMENTS

| 7,269,157 B2 * | 9/2007 | Klinker | ............... H04L 12/5695 370/228 |
| 7,423,971 B1 * | 9/2008 | Mohaban | .............. H04L 47/724 370/230 |

(Continued)

*Primary Examiner* — Wutchung Chu
(74) *Attorney, Agent, or Firm* — Parker Ibrahim & Berg LLC; James M. Behmke; Stephen D. LeBarron (57) ABSTRACT

In one embodiment, a device in a network receives a switchover policy for a particular type of traffic in the network. The device determines a predicted effect of directing a traffic flow of the particular type of traffic from a first path in the network to a second path in the network. The device determines whether the predicted effect of directing the traffic flow to the second path would violate the switchover policy. The device causes the traffic flow to be routed via the second path in the network, based on a determination that the predicted effect of directing the traffic flow to the second path would not violate the switchover policy for the particular type of traffic.

21 Claims, 6 Drawing Sheets

(56) References Cited

U.S. PATENT DOCUMENTS

| | | | |
|---|---|---|---|
| 7,760,643 B2 * | 7/2010 | Kim | H04L 12/5695 370/229 |
| 7,929,440 B2 * | 4/2011 | Tewani | H04L 45/22 370/232 |
| 7,995,477 B2 | 8/2011 | Atkins et al. | |
| 8,018,860 B1 * | 9/2011 | Cook | H04L 41/145 370/218 |
| 8,095,635 B2 | 1/2012 | Wang et al. | |
| 8,130,767 B2 | 3/2012 | Aitken et al. | |
| 8,325,612 B1 * | 12/2012 | Ruiz | H04L 45/16 370/238 |
| 2002/0101821 A1 * | 8/2002 | Feldmann | H04L 41/12 370/232 |
| 2002/0116487 A1 * | 8/2002 | Iseda | H04L 41/0213 709/223 |
| 2002/0186665 A1 * | 12/2002 | Chaffee | H04L 41/12 370/254 |
| 2003/0133443 A1 * | 7/2003 | Klinker | H04L 12/2602 370/353 |
| 2004/0073655 A1 * | 4/2004 | Kan | H04L 12/2602 709/224 |
| 2004/0218548 A1 * | 11/2004 | Kennedy | H04L 1/1685 370/254 |
| 2004/0218582 A1 * | 11/2004 | Kennedy | H04L 45/22 370/351 |
| 2005/0018608 A1 | 1/2005 | Wetherall et al. | |
| 2007/0237160 A1 * | 10/2007 | Natarajan | H04L 43/0894 370/397 |
| 2008/0159151 A1 * | 7/2008 | Datz | H04L 45/00 370/238 |
| 2009/0059793 A1 * | 3/2009 | Greenberg | H04L 41/0803 370/235 |
| 2009/0310485 A1 * | 12/2009 | Averi | H04L 45/00 370/232 |
| 2010/0050040 A1 * | 2/2010 | Samuels | H04L 12/24 714/749 |
| 2010/0061235 A1 * | 3/2010 | Pai | H04L 12/2801 370/230.1 |
| 2012/0294186 A1 * | 11/2012 | Gloss | H04L 12/2673 370/253 |
| 2015/0117203 A1 * | 4/2015 | Filsfils | H04L 47/122 370/235 |
| 2015/0195149 A1 * | 7/2015 | Vasseur | H04L 41/5009 370/252 |
| 2015/0222557 A1 * | 8/2015 | Bhattacharya | H04L 47/32 370/237 |
| 2015/0295856 A1 * | 10/2015 | Karthikeyan | H04L 65/80 370/230 |
| 2015/0333953 A1 * | 11/2015 | Vasseur | H04L 41/0668 370/228 |
| 2016/0337934 A1 * | 11/2016 | Meng | H04W 68/00 |

* cited by examiner

DYNAMIC PATH SWITCHOVER DECISION OVERRIDE BASED ON FLOW CHARACTERISTICS

RELATED APPLICATIONS

This application claims priority to U.S. Provisional Application No. 62/028,229, filed Jul. 23, 2014, entitled: "DYNAMIC PATH SWITCHOVER DECISION OVERRIDE BASED ON FLOW CHARACTERISTICS," by Vasseur et al., the contents of which are herein incorporated by reference.

TECHNICAL FIELD

The present disclosure relates generally to computer networks, and, more particularly, to dynamic path switchover decision override based on flow characteristics.

BACKGROUND

Enterprise networks are carrying a very fast growing volume of both business and non-business critical traffics. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

As the number of business and non-business critical applications increases, so too are the number and variety of service level agreements (SLAs) that may be in use by a network. In general, an SLA refers to a target or threshold level of performance guaranteed by the network, and may be associated with a particular type of traffic. For example, many real-time business applications are very bandwidth demanding and having corresponding SLAs that are used to ensure that a certain amount of network bandwidth is available for a particular flow of traffic.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device in a network receives a switchover policy for a particular type of traffic in the network. The device determines a predicted effect of directing a traffic flow of the particular type of traffic from a first path in the network to a second path in the network. The device determines whether the predicted effect of directing the traffic flow to the second path would violate the switchover policy. The device causes the traffic flow to be routed via the second path in the network, based on a determination that the predicted effect of directing the traffic flow to the second path would not violate the switchover policy for the particular type of traffic.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1:
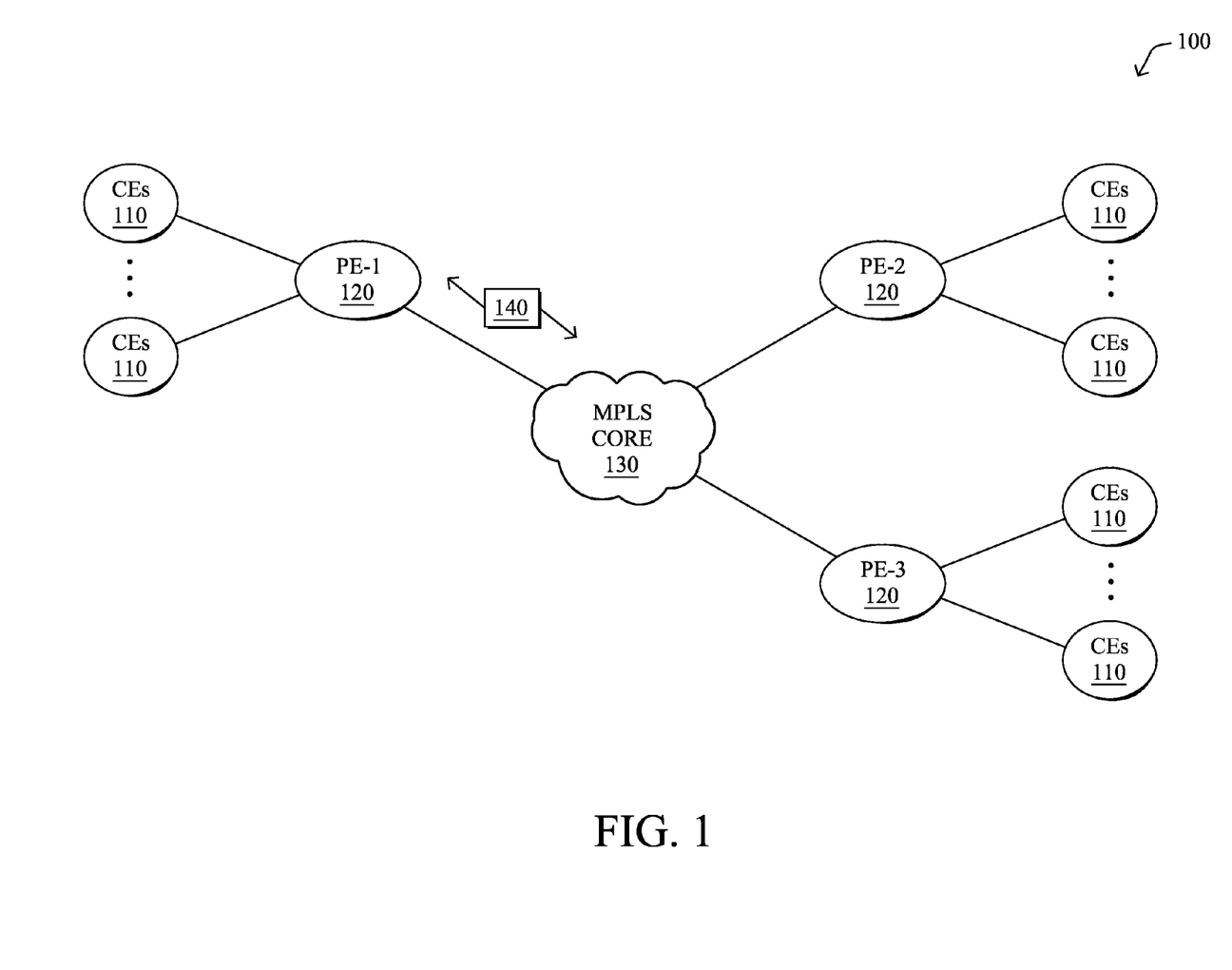
FIG. 1 illustrates an example communication network.

FIG. 1 is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative Multi-Protocol Label Switching (MPLS) core network 130. Alternatively, or in addition to, routers 110, 120 may be interconnected across a public Internet network. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router (or a set of routers) may be connected to a private network (e.g., dedicated leased lines, an optical network, etc.) or a virtual private network (VPN), such as an MPLS VPN thanks to a carrier network, via one or more links exhibiting very different network and SLA characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed SLA, whereas Internet links may either have no SLA at all or a loose SLA (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

As will be appreciated, the above topologies are illustrative only and the techniques herein may be used in any other form of computer network. For example, the techniques herein may be adapted for use in a mesh network, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such as the root node to a subset of devices inside the LLN) and multipoint-to-point traffic (from devices inside the LLN towards a central control point). Often, an IoT network is implemented with an LLN-like architecture.

Figure 2:
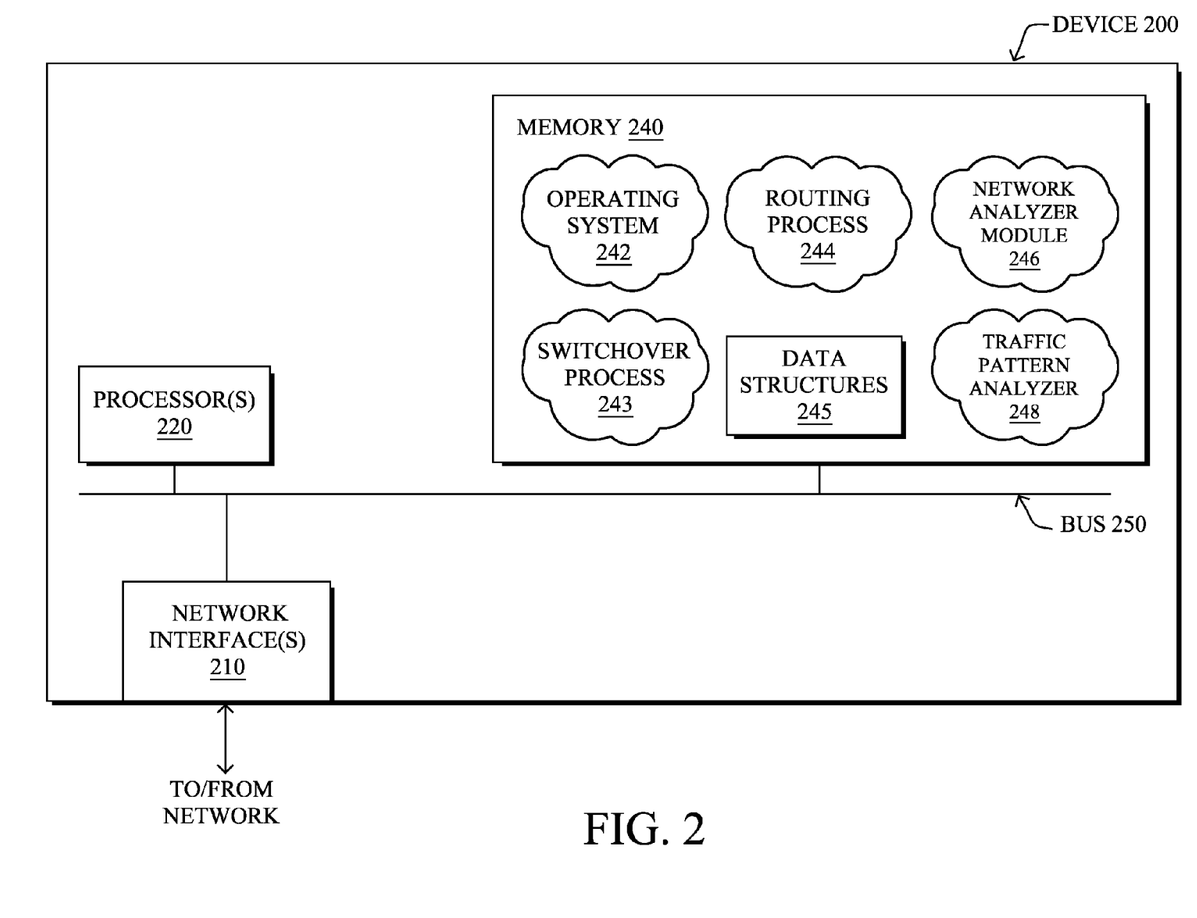
FIG. 2 illustrates an example network device/node.

FIG. 2 is a schematic block diagram of an example node/device 200 that may be used with one or more embodiments described herein, e.g., as any of the routers as shown in FIG. 1, particularly the PEs 120, CE routers 110, a network controller (e.g., a device associated with a network operations center (NOC)), or any other computing device that supports the operations of network 100 (e.g., switches, etc.). The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a network analyzer module (NAM) 246, a traffic pattern analyzer (TPA) 248, and/or a switchover process 243, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processors, it is expressly contemplated that various processors may be embodied as modules configured to operate in accordance with the techniques herein (e.g., according to the functionality of a similar process). Further, while processors may be shown and/or described separately, those skilled in the art will appreciate that processors may be routines or modules within other processors.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

In some implementations, routing services 244 may include a distributed application policy infrastructure controller (dAPIC) that operates to enforce application-specific policies on the local device. For example, the dAPIC may receive application-specific SLAs from a network controller via application programming interface (API) calls. Such information may be used, in some cases, to make routing decisions based on the type and priority of an application, as well as the performance of the various network links available to the device. In other words, the dAPIC in routing services 244 may be part of an application centric infrastructure (ACI) that operates to centralize network automation and facilitate the use of policy-driven application profiles throughout the network.

As noted above, traffic and network characteristics may be highly dynamic, making WAN optimization challenging. In addition, the variety of access links that may be involved (e.g., cable, A/V/DSL, links over private or public networks, etc.), potentially with guaranteed SLAs or semi-guaranteed SLAs, further complicates the task of network optimization. In some cases, customer sites may also be connected to backup links (e.g., 3G/4G/LTE wireless links) that provide highly varying performance in terms of connectivity and bandwidth.

Figure 3:
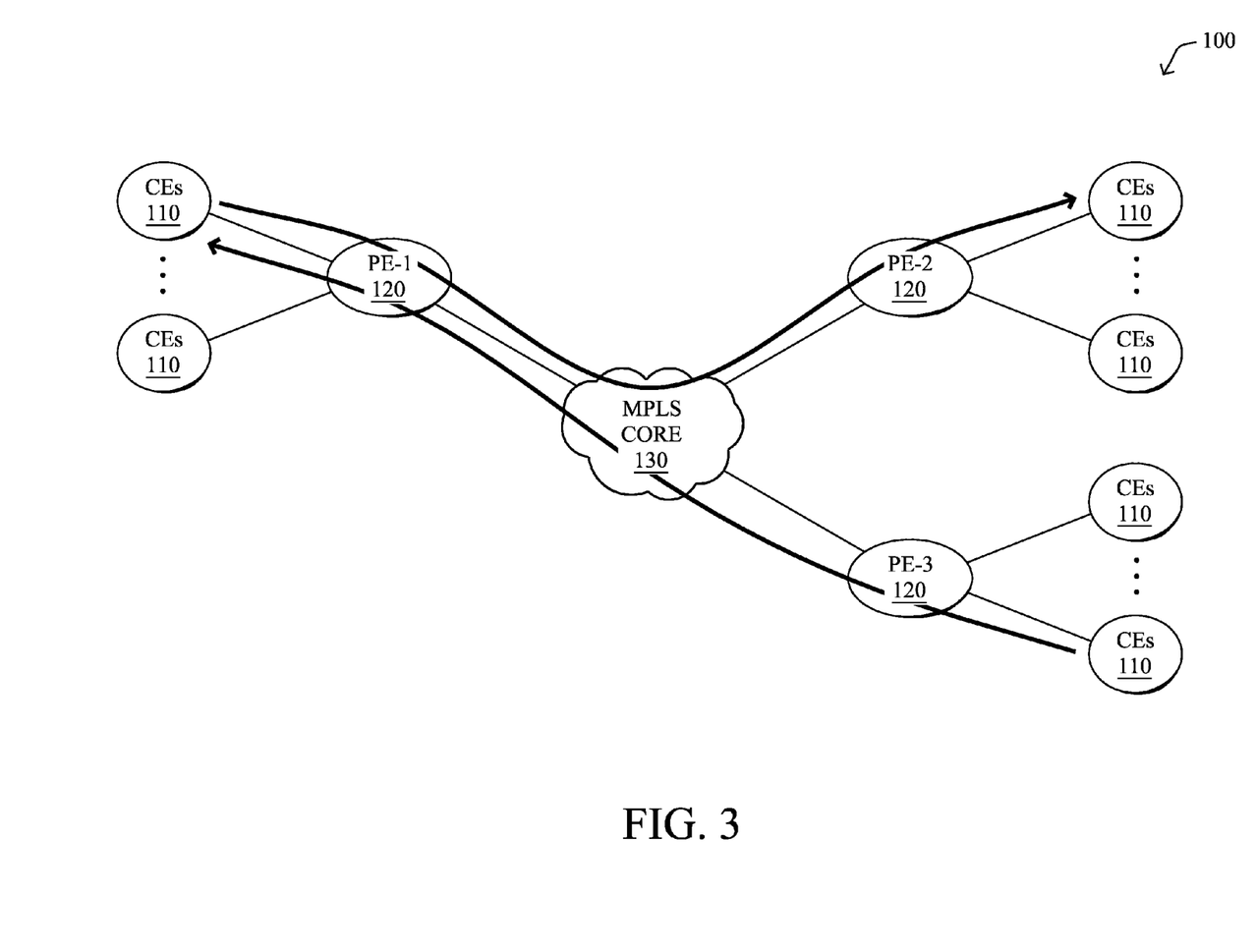
FIG. 3 illustrates an example view of traffic flowing within the communication network of FIG. 1.

Numerous types of application traffic may be flowing through current day networks. For example, as shown in FIG. 3, a particular CE 110 located at a customer site may provide and receive different forms of application traffic that is communicated through network 100. For example, traffic associated with a given customer site may include, but is not limited to, video data (e.g., video conferencing data), audio data (e.g., voice-over-IP (VoIP)), enterprise resource planning (ERP) data, customer relationship management (CRM) data, and the like. Each form of traffic may have specific network requirements and may be very demanding with respect to network availability and resiliency, such that even small deviations in network conditions may render an application incapable of providing the requisite experience to the end user. For example, low network performance may result in a video conference appearing choppy to the end users.

Traditionally, reactive techniques have been used to enforce network performance criteria, such as SLAs. First, the network itself is engineered by defining the application SLAs, quality of service (QoS) parameters, security settings, etc. Next, the performance criteria are monitored in view of the network's performance. If the performance criteria are not met, adjustments may then be made to the network in a reactive manner. Many networking mechanisms exist today to provide on-the-fly guaranteed network performance, such as call admission control, resource reservation, queuing, traffic shaping, etc. However, these tools require careful engineering to perform highly complex tasks in terms of traffic classification, QoS, routing, network and application SLA monitoring, etc. in view of the highly dynamic nature of the traffic and the network. All combined, these techniques make the configuration of a network extremely complicated, while still relying on the fundamental paradigm of reactive networking.

Reactive networking has been the traditional network-engineering paradigm for the past three decades. Indeed, policies and rules-based actions are first to determine the required Service Level Agreement (SLA) and the traffic is then classified (colored) using the differentiated services code point (DSCP) field either by the application itself or input routers such as due to Deep Packet Inspection. Routing engineering is a truly manual operation. Tunnels are set using various automated mechanisms to ensure security, and traffic monitoring is then performed in order to verify that the required SLAs are indeed met. As pointed out above, new performance-based routing approaches have been designed, but are fundamentally reactive: once the traffic is routed over a specific, pre-determined path, alarms are dynamically generated by the remote end upon SLA violation that may trigger the rerouting of the traffic.

Notably, one of the primary mechanisms of performance based routing (PfR) is to switch traffic over to alternate paths as soon as some sort of an alert is received on the current path. These alerts could carry a variety of information ranging from a change in delays or packet drops to the QoS being unfavorable. A concern with these kinds of mechanisms is that they do not take into account the historical characteristics of the traffic traversing the networks. As a result of this, many flows that would have concluded soon are exposed to packet reordering, jitter, and similar performance issues because they experience unnecessary switchovers.

Dynamic Path Switchover Decision Override

The techniques herein provide a dynamic path switchover decision override based on flow characteristics, such that when a traffic endpoint receives an alert to trigger a switchover, the decision can be overridden or selectively executed based on the mechanisms detailed herein. In particular, the techniques herein control traffic switchover activity when network conditions change. In one embodiment, a device receives a copy of all alerts that are generated from the underlying performance routing engine. An alert is then correlated with statistical attributes and a historical profile of all traffic egressing the system, to determine the most optimal course of action regarding a switchover, while taking into account policies for switchover on a per-type of flow basis and/or the estimate path characteristic of the alternate paths (when known). This can range from complete overrides to selective and granular switchovers. This contrasts with all other forms of reactive routing switchovers whereby alerts simply reroute traffic without taking into account the flow characteristics, policy-based switchover rules, and estimated alternate path characteristics, which is likely to trigger a very inappropriate switchover decision.

Illustratively, the techniques described herein may be performed by hardware, software, and/or firmware, such as in accordance with the switchover process 243, which may include computer executable instructions executed by the processor 220 to perform functions relating to the techniques described herein. For example, the techniques herein may be treated as extensions to machine learning processes and protocols, and as such, may be processed by similar components understood in the art that execute those processes and protocols, accordingly.

Specifically, according to various embodiments, a device in a network receives a switchover policy for a particular type of traffic in the network. The device determines a predicted effect of directing a traffic flow of the particular type of traffic from a first path in the network to a second path in the network. The device determines whether the predicted effect of directing the traffic flow to the second path would violate the switchover policy. The device causes the traffic flow to be routed via the second path in the network, based on a determination that the predicted effect of directing the traffic flow to the second path would not violate the switchover policy for the particular type of traffic.

Figure 4:
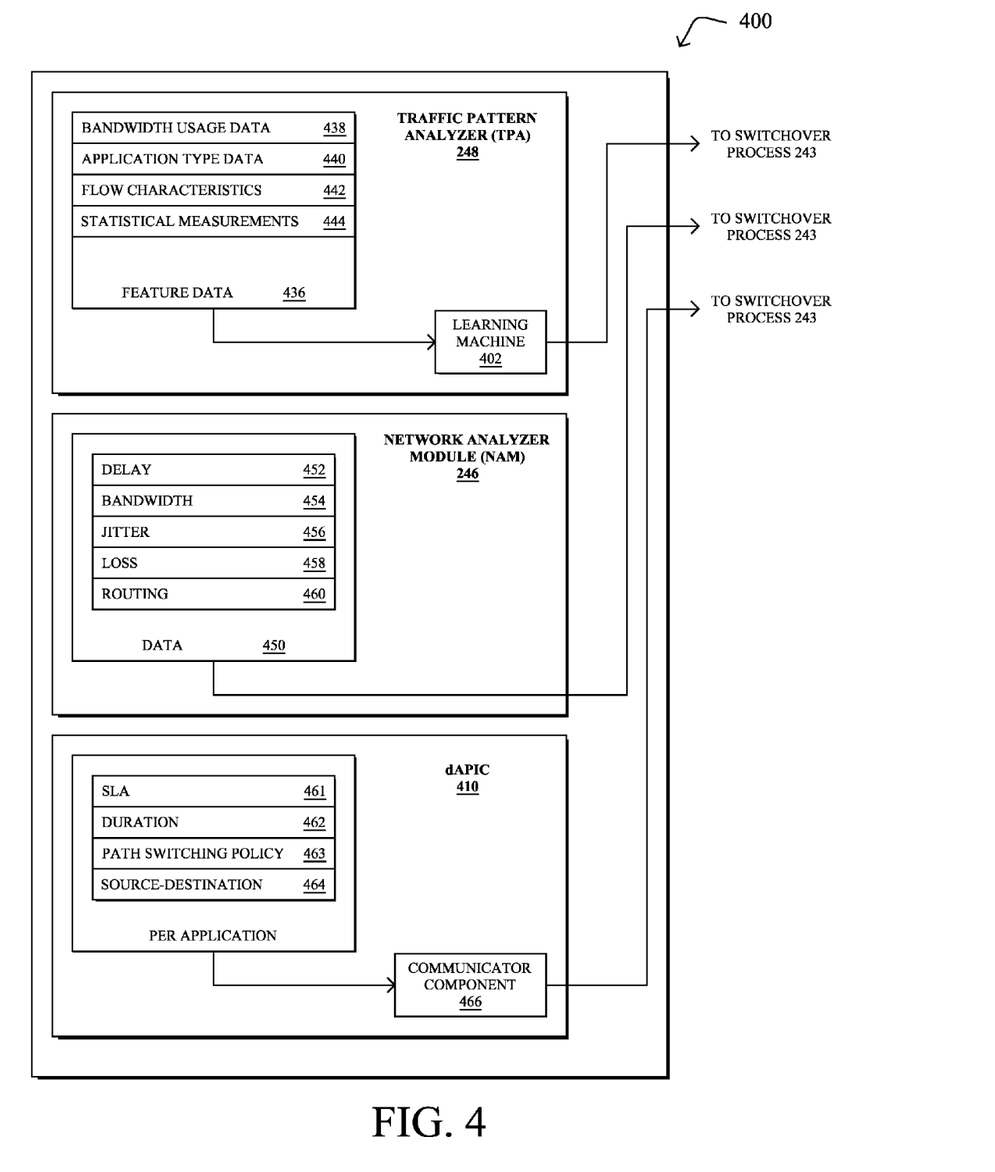
FIG. 4 illustrates an example architecture for analyzing a network.

Operationally, machine learning and other predictive techniques may be used to determine the predicted effect of directing a traffic flow to a different path. In particular, as shown in FIG. 4, architecture 400 for analyzing a network is shown. In a first aspect, network analyzer module (NAM) 246 may function as an alert tracker that is responsible for tracking and recording the alerts that are generated by the underlying performance routing engine. In particular, NAM 246 may determine the underlying reason for a performance alert in the network. For example, NAM 246 may analyze a received performance alert to determine data 450. In various embodiments, data 450 may include any or all of the following information:

1.) Delay Information 452: In some cases, data 450 includes delay measurements along a given network path and/or link. For example, a particular alert may indicate that the amount of delay along a given network path has crossed a specific threshold.

2.) Bandwidth Information 454: data 450 may also include bandwidth information associated with a given network path and/or link. For example, bandwidth information 454 may include data regarding the total bandwidth usage of the path or link, the per-application bandwidth usage of the path or link, available bandwidth along the path or link, etc. Accordingly, a received alert may indicate whether the available or in-use bandwidth associated with the path or link has crossed a specific threshold.

3.) Jitter Information 456: data 450 may further include jitter information associated with a given path and/or link. For example, a performance alert may indicate that the total amount or application-specific jitter measurements along a path or link has crossed a performance threshold.

4.) Packet Loss Information 458: In some cases, data 450 may include packet loss information, such as a measured packet loss rate along a given path and/or link.

5.) Routing Information 460: Associated with any of data 452-458 may be information regarding a given network path (e.g., the link or set of links for which the measurements of data 452-458 were determined). For example, an alert may indicate that one or more performance metrics for a particular routing path have crossed a performance threshold. In one embodiment, the alert may be associated with a specific type of traffic that uses the path (e.g., video traffic along the path may require that the path exhibit a certain level of guaranteed performance).

In another aspect of the techniques herein, traffic pattern analyzer (TPA) 248 may function as a traffic profile tracker that keeps track of the current profile of traffic. This may include detailed profiles of application flows, as well as the current traffic flows that are active in the network. In some embodiments, TPA 248 may make a list of traffic flows that are potentially associated with a performance alert received by NAM 246. In some embodiments, TPA 248 may model the traffic profiles using a learning machine process 402. Feature data 436 usable by learning machine process 402 may include any or all of the following:

1.) Bandwidth Usage Data 438: In some cases, feature data 436 may include data regarding the bandwidth usage of a particular type of traffic (e.g., application-specific bandwidth usage information). This information may provide a profile of the traffic over the course of time to learning machine 402.

2.) Application Type Data 440: Feature data 436 may include data regarding the various application types associated with the traffic (e.g., VoIP, video, etc.). In various embodiments, application types may be determined based on the port numbers used, via an application recognition utility (e.g., Network Based Application Recognition® of Cisco Systems, Inc.), or the like.

3.) Flow Characteristics 442: In some cases, feature data 436 may include traffic flow information such as the duration of a flow, the rate of new flows, metrics capturing the rate of change of the previous metrics over time, or other such information. These flow characteristics may be captured from underlying infrastructures such as an application recognition utility, a call manager, or the like.

4.) Statistical Measurements 444: In some embodiments, feature data 436 may include statistical measurements regarding traffic flows. For example, measurements 444 may include data regarding the moments (e.g., variance, skewness, kurtosis, etc.) of the traffic distribution, both in terms of packets/sec and bytes/sec, on a per flow basis, or on a per time path basis. In another example, measurements 444 may include other statistical properties of the traffic flow, such as autocorrelation, Fourier series coefficients, etc.

Together, feature data 436 can be used by learning machine 402 to determine characteristics of the underlying traffic flow and how it changes with time. Once learning machine 402 starts to develop a time series model using these attributes (e.g., a Hidden Markov Model, etc.), for example, it may decide that it needs more information about some of these features or, conversely, that some of these features are not relevant. In such cases, the update rate of the features may be adjusted accordingly by TPA 248 (e.g., to reduce the update rate of irrelevant data, etc.). In one embodiment, adjusting the refresh rate of feature data 436 may be policy-based to reduce traffic overhead in the network. For example, certain features may be collected or refreshed at different rates depending on the time of day, to reduce adverse effects on the network from the collection.

For example, if the alert received by NAM 246 corresponds to a jitter threshold crossing, then voice traffic will be affected. Similarly, if loss thresholds are crossed, then TCP traffic will be affected since TCP tends to overreact in the presence of packet loss due to exponential backoff. TPA 248 may provide a list of these possibly affected flows along with their characteristics (e.g., average duration, number of flows, history and future of flow patterns, etc.) with switchover process 243 for further analysis.

In another aspect, device 200 may include a dAPIC 410 that is configured to function as a policy tracker. Indeed, large enterprises such as banks make use of hundreds when not thousands of applications, where some of these applications (e.g., business critical applications, etc.) are highly sensitive to QoS degradation (e.g., jitter increase, bandwidth decrease, packet loss, etc.). In some implementations, dAPIC 410 may store and provide various application-specific data via a communicator component 466. In general, dAPIC 410 may be operable to ensure that all the application SLAs are being met at all times in the network and, consequently, perform various actions without human intervention, to dynamically adapt the network behavior as needed. Accordingly, dAPIC 410 may have access to various application-specific SLA information such as SLA data 461 (e.g., a set of SLAs), duration data 462 regarding the SLAs (e.g., when a particular SLA is to be enforced), and/or source-destination data 464 regarding the network paths used by the various applications.

In various embodiments, dAPIC 410 may also receive and store one or more switching policies 463. In general, a switchover policy indicates the conditions under which a particular type of traffic flow may be switched to another path, such as after an alert. For example, switchover policy 463 for a particular application/type of traffic may indicate one or more thresholds regarding the change in bandwidth, jitter, packet loss, delays, packet reordering, flow duration, etc. that would occur were the traffic flow routed along a different path.

In some embodiments, dAPIC 410 may receive a switchover policy 463 via a custom protocol extension to NETCONF, SNMPv3, or the like, that is used in order to indicate the criticality of a flow and when traffic switchover is in order. For example, a NETCONF message received by dAPIC 410 may specify that an application A is highly sensitive to packet reordering or to jitter. Such a policy may also indicate that, for traffic associated with application A, a bandwidth decrease is actually more preferable to a path switchover that would otherwise impact the path jitter. In one embodiment, one of switching policies 463 may correspond to a simple rule such as "do not switchover application A, if the predicted bandwidth decrease is greater than 30%" and/or "do not switchover application A, if the probability of packet re-ordering is more than 90%". In another embodiment, one of switching policies 463 may include more complex rules. For example, one policy may specify "for application B, perform the path switch if the estimated remaining duration of the flow is more than 10 seconds, the estimated path cost decrease (e.g., where cost reflects the bandwidth) is more than 20%, and the risk of packet re-ordering is below 5%").

Figure 5:
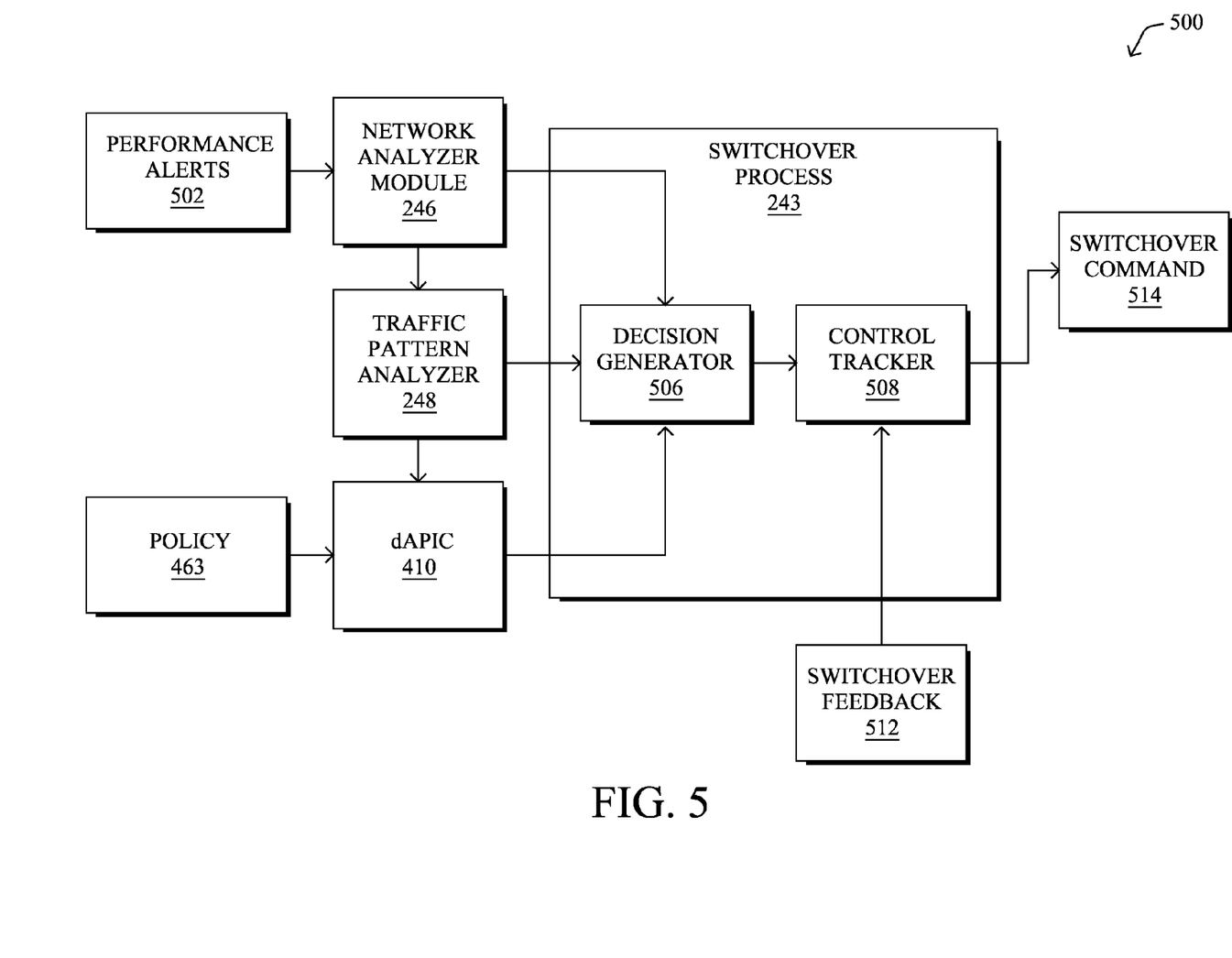
FIG. 5 illustrates an example architecture for controlling path switchovers.

Referring now to FIG. 5, an example architecture 500 for controlling path switchovers is shown, according to various embodiments. At the core of architecture 500 is switchover process 243, which may receive information from NAM 246, TPA 248, and/or dAPIC 410, to determine whether a path switchover should be allowed or prevented. As discussed above, NAM 246 may receive one or more performance alerts 502 regarding a particular path in the network. For example, alert 502 may be a threshold crossing alert that is generated automatically within the network based on the performance of the path. In turn, NAM 246 may determine the underlying reason for alert 502 and provide this information to TPA 248 and to switchover process 243. Based on the alert information, TPA 248 may generate a list of traffic flows that may be affected by the alert, as well as their characteristics, and provide this information to switchover process 243 and to dAPIC 410. Also as described above, dAPIC 410 may receive a switchover policy 263 (e.g., via a NETCONF or SNMPv3 message, etc.) and provide the corresponding policies for any of the traffic flows identified by TPA 248 to switchover process 243.

In various embodiments, switchover process 243 may include a decision generator 506 that determines whether a traffic flow should be switched to a different path based on an analysis of the root cause of the alarms (e.g., from NAM 246), the set of affected flows (e.g., from TPA 248), and whether a switch-over is appropriate considering the known property of the new path and the policy applied to the flow (e.g., from dAPIC 410). Generally, decision generator 506 is responsible for generating override decisions to switchover triggers and/or for adding granularity to switchover decisions such that only selective flows are moved.

When decision generator 506 receives the list of possible affected flows from TPA 248 and the alert details from NAM 246, it may analyze statistical metrics related to the flows. For example, decision generator 506 may analyze the average flow duration, the standard deviation of flow duration, the average number of flows, etc., to predict the future behavior of a flow.

In a second step, decision generator 506 may analyze the know properties of any alternate paths. Indeed, in performance routing-enabled environments, there is usually a primary and one or more alternate paths. Probes are sent along these alternates while traffic is routed onto preferred paths. Such probes (although not always sufficient) can be used to estimate the property of the alternate paths. For example, if an alert is reported by NAM 246 about delays violations, probes along alternate paths may be used to estimate the delay along such paths (as opposed to current implementations where the traffic is often blindly switched over to an alternate path). Decision generator 506 may also take into account other path attributes such as the static route cost, etc.

At this point, decision generator 506 may also take into account the nature of the alert and the policy rules for the set of traffic affected by the alerts, to decide the degree to which a switchover decision should be changed. For example, in one embodiment, if the statistical analysis performed by the traffic profile tracker indicates that 90% of all the flows are about to finish in the next few seconds, decision generator 506 may completely override/prevent the switchover from occurring. In another embodiment, if most of the flows will be long lived (e.g., their predicted flow durations are above a threshold amount), then decision generator 506 may allow all the flows to be switched over. In yet another embodiment, if decision generator 506 determines that a traffic switchover is likely to violate the policy for a flow in light of the estimated performance of the alternate path, decision generator 506 may prevent the path switchover.

In one embodiment, the threshold values for flow duration statistics can be determined by decision generator 506 using a learning machine that is continually tracking the optimal performance level in correlation to these parameters. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Learning machines are computational entities that rely on one or more machine learning processors for performing a task for which they have not been explicitly programmed to perform. In particular, learning machines are capable of adjusting their behavior to their environment. For example, a learning machine may dynamically make future predictions based on current or prior network measurements, may make control decisions based on the effects of prior control commands, etc.

Decision generator 506 may employ any number of different machine learning techniques. For example, artificial neural networks (ANNs) are a type of machine learning technique whose underlying mathematical models were developed inspired by the hypothesis that mental activity consists primarily of electrochemical activity between interconnected neurons. ANNs are sets of computational units (neurons) connected by directed weighted links. By combining the operations performed by neurons and the weights applied by the links, ANNs are able to perform highly non-linear operations to input data. The interesting aspect of ANNs, though, is not that they can produce highly non-linear outputs of the input, but that they can learn to reproduce a predefined behavior through a training process. Other forms of machine learning techniques that may be employed by decision generator 506 may include, but are not limited to, support vector machines (SVMs), Bayesian networks, regression techniques (e.g., logistic regression, linear regression, non-linear regression, etc.), combinations thereof, or any other form of machine learning.

In some embodiments, switchover process 243 may also include a control tracker 508 that is responsible for the actual triggering of the switchover decision and/or overriding the decision and/or selectively switching over some traffic flows only. For example, control tracker 508 may send a switchover command 514 to routing process 244 to either initiate or prevent a flow from being switched. In one embodiment, control tracker 508 may also track the effects of switchover commands 514 via switchover feedback 512. For example, if the alerts continue to arrive and newer traffic flows originate, then control tracker 508 may trigger a fast switchover as it knows about the pre-existing performance conditions in the network via switchover feedback 512. Switchover feedback 512 may include any performance metrics (e.g., bandwidth, delay, jitter, packet loss, etc.) that are measured after a path switchover, to determine whether the path switchover was effective. In other words, switchover process 243 may employ a control loop mechanism that ensures that switchover decisions are tracked closely and switchover decisions are made swiftly if the network conditions do not alleviate.

Figure 6:
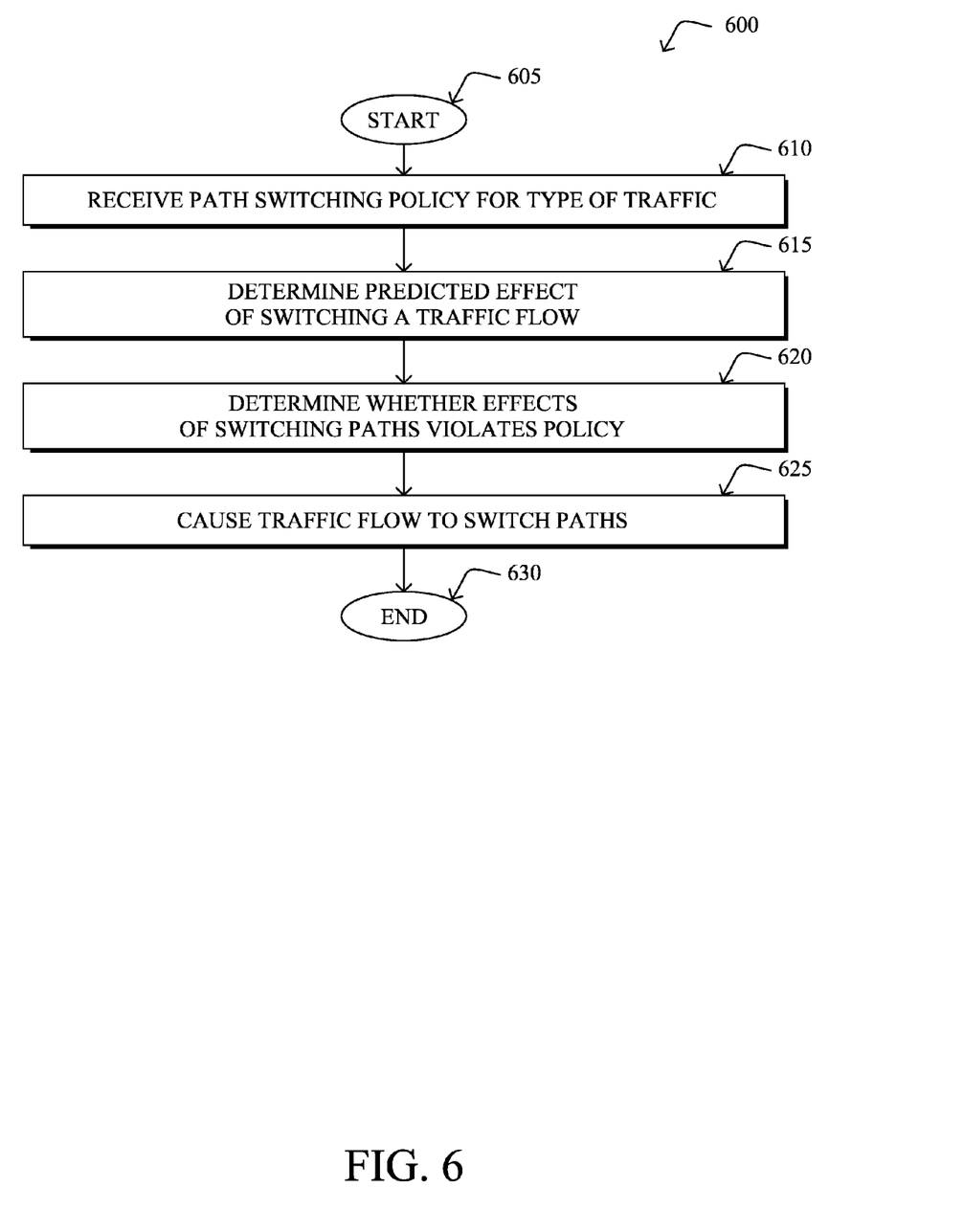
FIG. 6 illustrates an example simplified procedure for controlling a path switchover in a network.

FIG. 6 illustrates an example simplified procedure for controlling a path switchover in a network, according to various embodiments herein. Procedure 600 starts at step 605 and continues on to step 610 where, as described in greater detail above, a device receives a switchover policy for a type of traffic. The type of traffic may, for example, be associated with an application type, a specific application, a network address or port (e.g., a destination or source address), or the like. Example application types may include, but are not limited to, voice applications, video applications, automation applications, control applications, alert/notification applications, and the like.

Generally, the switchover policy includes one or more rules that control whether or not a flow of traffic should be directed to a different routing path. Example threshold parameters that may be used in such a rule may include, but are not limited to, an estimated remaining flow duration (e.g., how long the flow is expected to continue), an amount of packet reordering, a change in bandwidth, a change in jitter, a change in communication delays, a change in experienced packet loss, combinations thereof, or the like. For example, a simple switchover policy may specify that flows of a particular type of traffic should be switched only if the flow is expected to last longer than a threshold amount of time and the change in bandwidth as a result of the switch is below a certain threshold.

At step 615, the device determines a predicted effect of directing a flow of traffic sent along the network path to a second path, as detailed above. In some embodiments, the predicted effect may be based in part on measured performance characteristics of the alternate/second path. For example, probes sent along the second path may be used to determine the amount of jitter, bandwidth, etc. of the second path. Accordingly, the predicted effect of directing the traffic to the second path may correspond to one or more predicted performance differences between the two paths. In further embodiments, the predicted effect of directing the flow of traffic to the second path may be based on a traffic model of the particular type of traffic of the flow. For example, the device may maintain a time series model (e.g., a Hidden Markov Model, etc.) of the type of traffic, to predict the future behavior of the traffic. For example, based on the model, the device may predict when the traffic flow is likely to end. In a further embodiment, the effect may also be based in part on feedback received by the device about previous path switchovers (e.g., as part of a feedback mechanism used to adjust the switchover process).

At step 620, as detailed above, the device determines whether the predicted effects of directing the flow of traffic to the second path violates the switchover policy for the type of traffic. For example, the device may determine that switching the path is not likely to violate the policy, if the predicted duration of the traffic flow is greater than a threshold amount of time specified by the policy. Conversely, if the device predicts that the flow is likely to conclude within the threshold amount of time, the device may determine that the flow should not be directed to the second path (e.g., to avoid the effects of packet reordering). As would be appreciated, the switchover policy may be formed in a positive manner (e.g., do switch the path if a rule is satisfied) or in a negative manner (e.g., do not switch the path if a rule is met).

At step 625, the device causes the traffic flow to switch paths, as described in greater detail above. In particular, based on the determination made in step 620, the device may cause the traffic flow to be directed to the second path. For example, if the device predicts that the traffic flow is likely to be long-lived and the switchover policy for the type of traffic indicates that long-lived flows should be switched, the device may cause the traffic flow to switch to the second path. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for a dynamic path switchover decision override based on flow characteristics. In particular, according to the techniques herein, traffic switchovers are selectively undertaken when an alert arrives at a traffic egress point, thereby reducing the detrimental effects that could arise from such a sensitive switchover. In addition, the selective switchover of flows ensures there is less entropy in the network, thereby leading to lesser packet re-ordering, jitter etc. In another aspect, a control loop mechanism is disclosed that ensures that decisions are tracked closely and traffic switchover decisions are swiftly taken if the network conditions do not alleviate. In a further aspect, the techniques herein introduce an approach for switchover decisions, based on traffic profile prediction using machine learning techniques. Indeed, a switchover decision can be counter-productive, but the techniques herein effectively reduce the risk of collateral damage on the communications due to a switchover decision.

While there have been shown and described illustrative embodiments that provide for dynamic path switchover decision override based on flow characteristics, it is to be understood that various other adaptations and modifications may be made within the spirit and scope of the embodiments herein. For example, the techniques herein may be adapted for use within any kind of network using learning machines, and is not limited to those mentioned above. Additionally, the protocols discussed herein are exemplary only and other protocols may be used within the scope of the teachings herein. Further, while the techniques are described herein with reference to reactive networks, it is to be appreciated that the techniques herein may be used with any form of routing techniques that rely on the use alerts (e.g., predictive networking solutions that attempt to make routing decisions prior to the generation of an alert, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
receiving, at a device in a network, an alert regarding a performance change of a first path in the network;
receiving, at the device, a switchover policy for a particular type of traffic in the network;
in response to receiving the alert, determining, by the device, a predicted effect of directing a traffic flow of the particular type of traffic from the first path in the network to a second path in the network, the predicted effect corresponding to one or more predicted performance differences between the first path and the second path;
determining, by the device, whether the predicted effect of directing the traffic flow to the second path would violate the switchover policy;
causing, by the device, the traffic flow to be routed via the second path in the network, based on a determination that the predicted effect of directing the traffic flow to the second path would not violate the switchover policy for the particular type of traffic; and
preventing, by the device, switchover of the traffic flow to the second path in the network, based on a determination that the predicted effect of directing the traffic flow to the second path would violate the switchover policy for the particular type of traffic.

2. The method as in claim 1, wherein the predicted effect comprises a predicted amount of packet reordering that would occur were the traffic flow directed to the second path, and wherein the switchover policy indicates a threshold amount of acceptable packet reordering for the particular type of traffic.

3. The method as in claim 1, wherein the predicted effect comprises a predicted decrease in bandwidth for the traffic flow were the traffic flow routed via the second path, and wherein the switchover policy indicates a threshold amount of acceptable decrease in bandwidth for the particular type of traffic.

4. The method as in claim 1, wherein the predicted effect comprises a predicted duration for the traffic flow, and wherein the switchover policy indicates an acceptable flow duration in order for the traffic flow to be directed to the second path.

5. The method as in claim 1, further comprising:
generating, by the device, a machine learning model that models the particular type of traffic; and
using, by the device, the machine learning model to determine the predicted effect of directing the traffic flow to the second path.

6. The method as in claim 1, further comprising:
determining, by the device, an estimated performance of the second path; and
using, by the device, the estimated performance of the second path to determine the predicted effect of directing the traffic flow to the second path.

7. The method as in claim 1, further comprising:
receiving, at the device, feedback regarding one or more path switchovers; and
using, by the device, the received feedback to determine the predicted effect of directing the traffic flow to the second path.

8. An apparatus, comprising:
one or more network interfaces to communicate with a network;
a processor coupled to the network interfaces and configured to execute one or more processes; and
a memory configured to store a process executable by the processor, the process when executed operable to:

receive an alert regarding a performance change of a first path in the network;
receive a switchover policy for a particular type of traffic in the network;
in response to receiving the alert, determine a predicted effect of directing a traffic flow of the particular type of traffic from the first path in the network to a second path in the network, the predicted effect corresponding to one or more predicted performances differences between the first path and the second path;
determine whether the predicted effect of directing the traffic flow to the second path would violate the switchover policy;
cause the traffic flow to be routed via the second path in the network, based on a determination that the predicted effect of directing the traffic flow to the second path would not violate the switchover policy for the particular type of traffic; and
prevent switchover of the traffic flow to the second path in the network, based on a determination that the predicted effect of directing the traffic flow to the second path would violate the switchover policy for the particular type of traffic.

9. The apparatus as in claim 8, wherein the predicted effect comprises a predicted amount of packet reordering that would occur were the traffic flow directed to the second path, and wherein the switchover policy indicates a threshold amount of acceptable packet reordering for the particular type of traffic.

10. The apparatus as in claim 8, wherein the predicted effect comprises a predicted decrease in bandwidth for the traffic flow were the traffic flow routed via the second path, and wherein the switchover policy indicates a threshold amount of acceptable decrease in bandwidth for the particular type of traffic.

11. The apparatus as in claim 8, wherein the predicted effect comprises a predicted duration for the traffic flow, and wherein the switchover policy indicates an acceptable flow duration in order for the traffic flow to be directed to the second path.

12. The apparatus as in claim 8, wherein the process when executed is further operable to:
generate a machine learning model that models the particular type of traffic; and
use the machine learning model to determine the predicted effect of directing the traffic flow to the second path.

13. The apparatus as in claim 8, wherein the process when executed is further operable to:
determine an estimated performance of the second path; and
use the estimated performance of the second path to determine the predicted effect of directing the traffic flow to the second path.

14. The apparatus as in claim 8, wherein the process when executed is further operable to:
receive feedback regarding one or more path switchovers; and
use the received feedback to determine the predicted effect of directing the traffic flow to the second path.

15. A tangible, non-transitory, computer-readable media having software encoded thereon, the software when executed by a processor of a device operable to:

receive an alert regarding a performance change of a first path in the network;
receive a switchover policy for a particular type of traffic in the network;
in response to receiving the alert, determine a predicted effect of directing a traffic flow of the particular type of traffic from the first path in the network to a second path in the network, the predicted effect corresponding to one or more predicted performance differences between the first path and the second path;
determine whether the predicted effect of directing the traffic flow to the second path would violate the switchover policy;
cause the traffic flow to be routed via the second path in the network, based on a determination that the predicted effect of directing the traffic flow to the second path would not violate the switchover policy for the particular type of traffic; and
prevent switchover of the traffic flow to the second path in the network, based on a determination that the predicted effect of directing the traffic to the second path would violate the switchover policy for the particular type of traffic.

16. The computer-readable media as in claim 15, wherein the predicted effect comprises a predicted amount of packet reordering that would occur were the traffic flow directing to the second path, and wherein the switchover policy indicates a threshold amount of acceptable packet reordering for the particular type of traffic.

17. The computer-readable media as in claim 15, wherein the predicted effect comprises a predicted decrease in bandwidth for the traffic flow were the traffic flow routed via the second path, and wherein the switchover policy indicates a threshold amount of acceptable decrease in bandwidth for the particular type of traffic.

18. The computer-readable media as in claim 15, wherein the predicted effect comprises a predicted duration for the traffic flow, and wherein the switchover policy indicates an acceptable flow duration in order for the traffic flow to be directed to the second path.

19. The computer-readable media as in claim 15, wherein the software when executed is further operable to:
generate a machine learning model that models the particular type of traffic; and
use the machine learning model to determine the predicted effect of directing the traffic flow to the second path.

20. The computer-readable media as in claim 15, wherein the software when executed is further operable to:
determine an estimated performance of the second path; and
use the estimated performance of the second path to determine the predicted effect of directing the traffic flow to the second path.

21. The computer-readable media as in claim 15, wherein the software when executed is further operable to:
receive feedback regarding one or more path switchovers; and
use the received feedback to determine the predicted effect of directing the traffic flow to the second path.

* * * * *